Oct. 18, 1960 J. O. HENDRICKS 2,956,904
PRESSURE-SENSITIVE ADHESIVE TAPES
Filed Nov. 4, 1954
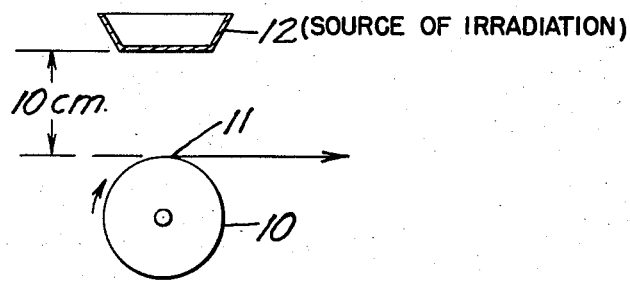
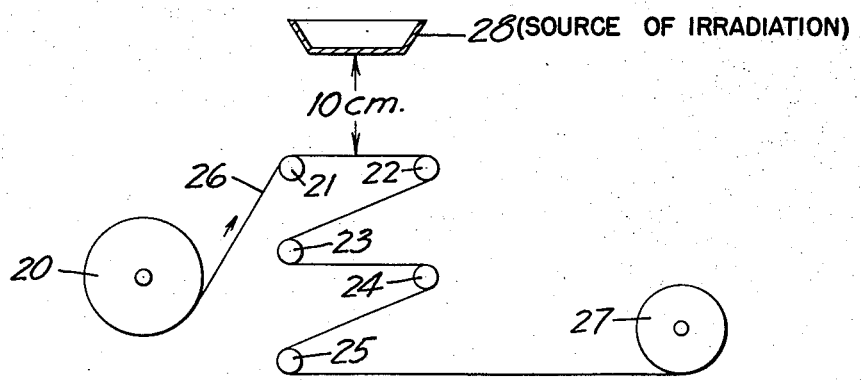
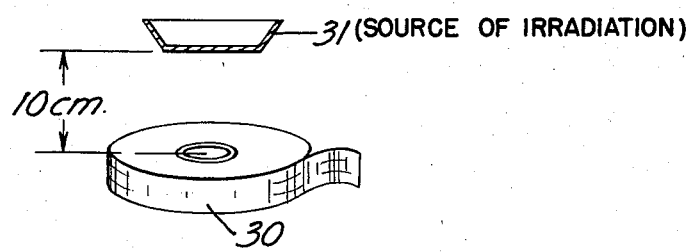
INVENTOR
JAMES O. HENDRICKS
BY
Carpenter, Abbott, Coulter & Kinney
ATTORNEYS United States Patent Office 2,956,904
Patented Oct. 18, 1960

2,956,904

PRESSURE-SENSITIVE ADHESIVE TAPES

James O. Hendricks, White Bear Lake, Minn., assignor to Minnesota Mining & Manufacturing Company, St. Paul, Minn., a corporation of Delaware Filed Nov. 4, 1954, Ser. No. 466,917

12 Claims. (Cl. 117—93)

This invention relates to pressure-sensitive adhesive tapes, and more particularly to a novel method of making pressure-sensitive adhesive tapes whereby the adhesive coating composition is subjected to a physical treatment involving the use of irradiation. Pressure-sensitive adhesive tapes having improved and novel adhesive characteristics are obtained.

Various properties such as cohesion, firmness, adhesion, wet grab, tack, and the like, are exhibited in the pressure-sensitive adhesive tapes hereof in improved combinations. Wet grab is the property of a pressure-sensitive adhesive tape to adhere to a surface immediately upon contact, the force of application being no greater than the weight of the tape backing. Tack is the sticky nature of an adhesive.

Pressure-sensitive adhesive tapes have a wide variety of uses such as in packaging and mending, and have other particularly important uses as noted hereinafter in describing the improvements effected by the present invention.

Pressure-sensitive adhesive tapes essentially consist of a flexible backing member having a normally tacky and pressure-sensitive adhesive layer bonded thereto. The backing may be of various cloths, papers, synthetic films and fibers, transparent films, and the like. It may be treated with a primer composition to anchor the adhesive layer to the face side thereof so that the adhesive does not transfer or offset when the tape is unwound from the roll. On the back side of the backing member a low adhesion backsize composition may be coated so as to facilitate unwinding to the tape from rolls. In some structures, however, both sides of the backing member are coated with a pressure-sensitive adhesive layer, the tape then being wound up with a removable separator or liner member.

The adhesive layer of these tapes is of the rubber-resin type. Examples of typical rubber-resin type adhesives may be found in U.S. Patents Nos. 2,236,527, 2,410,078, 2,410,089, 2,438,195, and 2,553,816.

These adhesives have a base of rubbery material, either natural or synthetic which provides cohesion (internal strength), and elasticity (a retractive force when stretched and retraction when released after stretching). The rubbery material is modified by blending with a compatible tackifier resin (such as a rosin or ester gum) which serves to increase adhesion (tackiness) and decrease cohesion with an attendant increase of stretchiness (elongation under low stresses) and decrease of elasticity. These rubber-resin type adhesives have a proper fourfold balance of adhesion, cohesion, stretchiness and elasticity; which permits adhesive tape coated therewith to be aggressively and stably tacky and yet be capable of being stripped back from a smooth surface to which temporarily applied without delamination, splitting, or off-setting of adhesive. Certain synthetic polymers are inherently pressure-sensitive and possess the above-mentioned fourfold balance of properties, thus being equivalents of the rubber resin adhesives and regarded as the rubber-resin type. An example is a 75:25 copolymer of 2-ethyl-butyl-acrylate and ethyl-acrylate.

These rubber-resin type pressure-sensitive adhesive tapes must be eucohesive, that is, they must be more cohesive than adhesive so that offsetting or transfer of adhesive material does not result when the tape is unwound from rolls or removed from surfaces to which temporarily applied, and so that the tape can be handled without transfer of adhesive material to the finger. Because of the fourfold balance of characteristics required in rubber-resin type adhesive formulations, therefore, there has been a practical limit of cohesiveness attainable while still retaining adequate adhesiveness, tack, and the like, in the rubber-resin type layer.

Necessarily attempts to improve the cohesive characteristics of rubber-resin type pressure-sensitive adhesives have been limited in the past to adjusting relative amounts of rubber and resin (where both components are present), or by using chemical vulcanizing or curing agents. But vulcanizing a pressure-sensitive adhesive to attain internal strength properties comparable to those obtained by the teachings hereof causes a decrease in adhesion, wet grab, and the like, of the resulting tape. Furthermore, it is desirable not to use sulfur curing to gain high internal strength in tapes intended for use on light colored enamels and lacquers, so as to avoid any tendency of staining such surfaces.

Sometimes the strength properties of an adhesive layer are exceptionally improved by treating it under heat with a phenol-aldehyde resin, which is well illustrated in U.S. Patent No. 2,410,053. In this patent, rubber-reactive, oil-soluble, heat-advancing, phenol-aldehyde resins are employed with rubber-resin type adhesives to gain outstanding cohesive strength. It is pointed out in this specification, however, that the method results in a reduction of the tackiness of the adhesive layer.

In short, there has been no known simple way to greatly increase the internal strength properties of a pressure-sensitive adhesive, that is the property of cohesion, which is required for a strong bond, without in some way adversely affecting adhesion which is required for any bond at all.

This invention fills this gap in the art and provides a method whereby a wide variety of rubber-resin type pressure-sensitive adhesives may be improved in cohesive strength without loss or deterioration, immediately or thereafter, of adhesive properties, tack, wet grab, and the like. The rubber-resin type pressure-sensitive adhesive tapes obtained by the practice of this invention have outstandingly tough cohesive strength properties in combination with high adhesive strength properties, a combination not found in any like formulation of identical components in the prior art. It should also be noted that excellent control of the various characteristic properties of pressure-sensitive adhesive tapes is possible by the teachings hereof.

The above and other advantages of this invention, to be particularly noted from a scrutiny of the specific examples hereof, are obtained by a simple process involving fundamentally a single step. This step amounts to using high-energy electrons to bombard an adhesive layer adapted to provide the pressure-sensitive adhesive material of the product. Bombardment using high-energy electrons having an energy on the order of a million electron volts or more has resulted in successfully gaining the results hereof. However, high-energy electrons at much lower energy levels than a million electron volts may effectively be used to gain measurable improvements in the relatively thin adhesive layers here contemplated. Energy levels of high-energy electrons above 3 or 4 million electron volts have not been found necessary nor especially desirable to gain improved results in pressure-sensitive adhesives.

High-energy electron irradiation of adhesive layers to gain the improved results of this invention may be accomplished in a variety of specific ways. Exemplary specific conditions of treatment are detailed below in discussing the process with particular reference to the drawings made a part hereof.

At this point, however, it may be noted that suitable high-energy electron irradiation of an adhesive layer may be accomplished by moving such a layer at a certain rate through a field of high-energy electrons such as those discharged from a cathode ray tube powered by a resonant transformer (i.e., a resonant transformer type X-ray apparatus with its tungsten target removed). Such apparatus operated at one million volts and 500 microamps. will give a high-energy electron dose level of approximately 35 megareps. per minute at a point 10 cm. below a 2½ inch diameter window thereof. If a single layer of adhesive such as in the examples to follow is moved at the approximate rate of 28 inches per minute at a distance of 10 cm. beneath the source window of the above apparatus operated under conditions as above specified, an approximate 3 megarep. dose level of absorption of high-energy electrons results. Alternately, the adhesive layer may be given the same dose level of absorption by being moved at a slower rate through a path of high-energy electrons emanating from a cathode ray tube powered by a resonant transformer operated under reduced voltage and/or amperage. Under increased source conditions, more rapid movement of the adhesive layer through the path of irradiation is necessary for an equal dosage level, i.e., 3 megareps.

The dose level of high-energy electron irradiation given any particular adhesive is varied as explained herein depending upon the results desired and the specified adhesive subjected to treatment. A dose of at least one megarep. is required to gain any appreciable improvement in the cohesive strength of most adhesives. Above 5 megareps., the improvement generally falls off and the increased dosage is largely wasted; however, some adhesive tapes are advantageously treated with doses up to approximately 10 megareps., or even higher. For example, some rubber-resin type adhesive tapes containing phenolic resins may advantageously be given doses up to approximately 10 megareps. Some adhesive polymers used in making pressure-sensitive adhesive tapes, as in Example VIII hereof, may advantageously be given dose levels of irradiation up to approximately 20 megareps. (A rep. is a modified Roentgen unit, i.e., a Roentgen equivalent physical. The energy lost in the absorption of one Roentgen of gamma radiation by air is the equivalent of one rep. of ionization in a tissue. One million reps., i.e, a megarep., may be defined as $84 \times 10^6$ ergs. per gram or 3.8 kilowatt-seconds per pound.)

That high-energy electron irradiation may be used to cure or vulcanize certain classes of polymers is well known, and in this respect it is an equivalent of the sulfur-curing and vulcanizing process in the prior art. It has been recognized as a means whereby the solubility of polymers may be decreased and the internal strength thereof increased, just as prior art curing and vulcanizing methods have been employed as a means for accomplishing the same result. As applied to rubber-resin type adhesives, however, high-energy electron irradiation gives new and unexpected results. Rubber-resin type, pressure-sensitive adhesive tapes are, by this irradiation, firmed up and increased in internal strength, i.e., cohesiveness, but, unexpectedly are at the same time not deteriorated in other properties such as adhesiveness, wet grab, tack and the like. In fact these latter properties are in some cases greatly improved. It is evident therefore that irradiation of rubber-resin type pressure-sensitive adhesives is by no means the equivalent of prior art vulcanizing or curing methods as applied to rubber-resin type adhesives.

To accurately illustrate the outstanding advance in the art of pressure-sensitive adhesives offered by this invention, but not to limit the teachings hereof, the following examples are offered:

*Example I*

|   | Parts by weight |
|---|---|
| Latex crepe natural rubber | 100 |
| Pentaerythritol ester of wood rosin | 75 |
| Di-tertiary amyl hydroquinone | 2 |
| Heptane | 700 |

The pentaerythritol ester of wood rosin ("Pentalyn A") is a compatible, tackifying resin having a low acid number and a melting point of 112°–114° C.

The rubber was first lightly milled and thereafter all the constituents were dispersed in the solvent using a paddle-type mixer. The blended adhesive solution was then knife coated on a previously primed surface of cellophane and the solvent removed by evaporation. The coating weight employed gave a dried adhesive weight of approximately 6 to 7 grains per 24 square inches of tape surface.

Part of the tape so made was irradiated with high-energy electrons to a dose level of 1 megarep. by passing it at a rate of 14 inches per minute at a distance of 10 cm. beneath a 2½ inch diameter window of a cathode ray tube powered by a resonant transformer operated at one million volts and 83 microamps. Another section of this tape was given a dose level of 3 megareps. by operating the apparatus at 250 microamps. and using otherwise identical conditions. Part of the tape was retained untreated as a control.

The three samples were then tested to determine their cohesive strength as well as adhesive characteristics by a test which may be designated as a "hot shear test."

In this test the end of a strip of tape is placed face down on the edge of a polished steel plate (size 4″ x 8″ x 1/16″) so that an area ½″ x ½″ of the adhesive side of the tape is in contact with a like area at the edge of the plate. A 4½ pound hard rubber roller is then rolled over the ½″ square area of tape in contact with the plate four times at a speed of 12 inches per minute. Thereafter, the plate is suspended in a rack so that the plane of the plate is at an angle of 2° from a vertical position, with the tape on the upper surface and hanging over the lower edge of the plate. The tape is bonded to the lower area of the suspended plate. The construction is then heated in an oven for 10 minutes at 120° F., at the end of which period a one kilogram weight is hung from the dangling end of the tape and the assembly retained at 120° F. Over a period of time after the weight is suspended, the adhesive splits, i.e., runs or flows, and the tape is pulled downwardly from the plate and around the edge thereof by the suspended weight. The time for this is measured in minutes and is proportional to adhesive internal strength.

Using this test, the adhesive of the non-irradiated sample split and the tape dropped off after approximately 6 minutes. The sample given a dose level of 1 megarep., however, remained firm and did not split and fail until after 22 minutes had passed. The sample given a dose level of 3 megareps. did not fail until after 25 minutes.

Even more surprising, however, was the fact that each sample performed the same under tests designed to measure adhesive bonding characteristics. A suitable test for measuring this property is one which may be termed a "strip-back" test. A strip of ½ inch wide tape, adhesive side down, is placed on a clean polished steel panel and a 4.5 pound hard rubber roller passed once over the strip at the rate of 7.5 feet per minute. One end of the strip is then attached to a suitable scale and the steel plate moved away from the scale at a rate of 7.5 feet per minute and so that the portion or the tape removed comes back adjacent but not quite touching the portion still adherently attached. The adhesion value of the tape is read in ounces.

Under this test each of the three samples gave adhesion values of 31 ounces. Wet grab, tack, shock resistance, etc., were likewise unchanged in all samples.

*Example II*

|  | Parts by weight |
|---|---|
| Latex crepe natural rubber | 50 |
| Rubbery butadiene-styrene copolymer | 50 |
| Di-tertiary amyl hydroquinone | 1 |
| Polymerized terpene resin | 60 |
| Heptane | 650 |

The rubbery butadiene-styrene copolymer of this example was "GRS X-274" which is a copolymer of 72 parts butadiene and 28 parts styrene and contains a small proportion, viz, 1.25%, of a mixture of mono and di-heptyl diphenyl amines as an anti-oxidant.

The polymerized terpene resin used was "Piccolyte S-115" which is a pure hydrocarbon thermoplastic terpene resin melting at 115° C. and being essentially zero in acid number.

The rubbery materials were lightly milled and all constituents mixed together in a paddle-type mixer. A previously primed cellophane backing was then solvent coated with a layer of the adhesive mass and the solvent evaporated.

As with Example I, part of the tape so prepared was left untreated, part was given a high-energy electron irradiation dose level of approximately 1 megarep., and part approximately 3 megareps. The specific conditions of irradiation employed in this example were the same as those used for Example I.

The comparative performance of the three samples in the hot shear test aforementioned was as follows: the sample of non-irradiated tape failed after 7 minutes; the sample given a dose level of 1 megarep. refused to fail until more than 35 minutes had passed; and the sample given a dose level of 3 megareps. irradiation remained firm, unsplit, and in other wise outstanding condtion for a total period of 100 minutes before failing.

Adhesivewise, the non-irradiated tape gave a reading of 33 ounces as measured by the "strip-back" test aforedescribed; the tape given a dose level of 1 megarep. gave a reading of 32 ounces; and the tape given a 3 megarep. level of irradiation, a reading of 33 ounces. The one ounce difference in adhesive values, as measured by the aforementioned test, is within the limits of experimental error.

*Example III*

|  | Parts by weight |
|---|---|
| Rubbery butadiene-styrene copolymer | 100 |
| Polymerized wood rosin | 45 |
| Heptane | 500 |

The rubbery butadiene-styrene copolymer of this example was the same as that employed in Example II. The above ingredients were worked together into a uniform blend, coated on a backing as in Example I, and the coated layer dried. A dried coating weight of 7 grains per 24 square inches of backing was employed.

Part of the tape so formed was retained as a control, part given a high-energy electron irradiation dose level of 1 megarep., and part given a dose level of 3 megareps. Conditions such as set forth in Example I were employed. Using the hot shear test, the non-irradiated tape failed in 4 minutes, the tape given 1 megarep. refused to fail until after 29 minutes, and the tape given 3 megareps. did not split and fail until after 48 minutes. Adhesivewise, each of the three samples gave substantially identical performance, i.e., readings of 35 ounces in the strip-back test.

*Example IV*

|  | Parts by weight |
|---|---|
| Polyvinylethyl ether in toluene (20% solids) | 100 |
| Tricresyl phosphate in toluene (10% solids) | 3 |

The polyvinylethyl ether used was obtained under the trade designation "EXBM" from Carbide and Carbon Chemical Co. It had a concentration of 20% solids by weight and an inherent viscosity of 3.2.

Three parts of a solution containing 10% by weight of tricresyl phosphate in toluene were stirred into the solution containing the ether elastomer and the resulting adhesive coated on a previously primed cellophane backing and dried. A dried coating weight of 7 grains per 24 square inches of backing was employed.

Using the hot shear test, the resulting tape failed in 4 minutes. A sample irradiated with high-energy electrons to a dose level of 1 megarep. was strengthened internally sufficiently to withstand 13 minutes in the hot shear test, and a sample irradiated to a dose level of 3 megareps. withstood 52 minutes. The adhesive properties of each sample, as measured by the aforedescribed strip-back test, gave a value of 26 ounces.

*Example V*

A copolymer of 50 parts methyl isoamylacrylate and 50 parts fusel oil acrylate having an inherent viscosity of 1.8 was dissolved in a solvent comprised of 1 part toluene and 3.7 parts heptane so that a 20% solids by weight solution was obtained. The resulting solution was coated on a primed backing of cellulose acetate and dried.

Fusel oil acrylate is a mixture of acrylic acid esters of the various alcohols in fusel oil. Commercial fusel oil has a variable composition and contains approximately 55-80% primary amyl alcohols, 15-45% primary butyl alcohols, and 0-5% n-propyl alcohol.

The tape formed as above stated withstood only 1 minute of shearing force in the hot shear test. A sample irradiated with high-energy electrons to a dose level of 1 megarep. withstood 74 minutes. At a dose level of 3 megareps. irradiation, this tape refused to fail until 200 minutes had passed in the test. Such a remarkable improvement was accompanied by no significant change in adhesion, wet grab, tack or other properties. Strip-back adhesion readings dropped from 22 ounces to 21 ounces as a result of irradiation, which is considered an insignificant change.

Polyacrylate pressure-sensitive adhesives, previously described as being of the rubber-resin type, are particularly desirable for the reason of their clearness, transparency and stability to sun aging but have been considered too weak in cohesive strength in the past for many uses, e.g., uses such as those requiring the retention of the rolled-over tops of paper bags and the like in packaging or closed position. In such cases, the packaging bond is under constant static stress forces tending to break the bond and free the contents of the bag. High-energy electron irradiation, however, improves these tapes so that they now are eminently suitable for uses such as those requiring reliable sturdy packaging bonds. Other methods of improving tapes having an acrylate elastomeric component have been attempted but have suffered severe disadvantages. For example, the cohesive strength of the adhesive may be somewhat increased by the addition of a reactive phenolic resin and heating the adhesive layer. But optical clarity and other valuable properties of the tape are lost as a result of such a step.

*Example VI*

A silicone pressure-sensitive adhesive known as "XC-269," manufactured by the Dow-Corning Corp., was obtained as 40% solids solution in xylene and having a viscosity of 10,000–20,000 cps. Brookfield. This solution was knife coated on a glass cloth backing and dried to produce a tape having about 24 grains of dry adhesive per 24 square inches of cloth.

The non-irradiated tape withstood only 3 minutes in the hot shear test. At a 1 megarep. high-energy electron irradiation dose level, the tape withstood 22 minutes in this test; and at a 3 magarep. level, the tape withstood the heretofore unheard of time of 220 minutes. In addition to gaining this astounding improvement in cohesive strength, the pressure-sensitive adhesive of this example irradiated with high-energy electrons remained unchanged from the non-irradiated sample with respect to adhesiveness, wet grab, tack and the like.

Silicone pressure-sensitive adhesives are comparatively new to the art of rubber-resin type pressure-sensitive adhesives. In the respects here pertinent, they behave in substantially the same manner, i.e., function, to give substantially the same result in substantially the same way as rubber-resin type adhesives; and therefore, are considered the equivalent of rubber-resin type adhesives.

They are difficultly curable when employed as the adhesive in pressure-sensitive tapes. The method here disclosed gives remarkably rapid cures without deleteriously affecting the tape in other respects.

Essentially, silicone pressure-sensitive adhesives comprise polymeric organic silicone compounds or mixtures of compounds having the proper balance of adhesion, cohesion, stretchiness and elasticity, and having a silicon-oxygen skeleton with organic radicals also attached to silicon atoms.

An example of such an adhesive is one containing 5–70% of a soluble liquid resin and correspondingly 95–30% of a high molecular weight elastomeric polymer. The liquid resin contains generally monovalent $R_3SiO_{.5}$— radicals and tetravalent

radicals in the ratio of about 6–9 of the former to 10 of the latter, R being alkyl or phenyl, the alkyl groups having less than 4 carbon atoms and constituting at least about 90% of the R groups. The elastomeric polymer may have a general formula $(-R'_2SiO-)_x$ at least 90% of the R' groups being methyl, any remainder being methyl or phenyl, and $x$ being sufficiently large to provide a viscosity of at least about one million centistokes at 25° C. Up to about 10% of a titanium compound $Ti(OR'')_4$ may be included as a heat-curing agent, R'' being an aliphatic or hydroxylated aliphatic hydrocarbon radical of less than about 20 carbon atoms. One such silicone polymer pressure-sensitive adhesive is the "XC-269" aforementioned.

*Example VII*

Approximately 50 parts of latex crepe natural rubber and approximately 50 parts polyisobutylene having an average molecular weight of 120,000 were rubber-milled together and dispersed to a uniform blend in approximately 600 parts heptane. The resulting blend was coated on a backing, and the solvent evaporated. At this point the coated sheet material so formed possessed little or no tack, wet grab, etc. High-energy electron irradiation at a dose level of 3 megareps. however converted this intermediate product into a pressure-sensitive adhesive tape product having substantial cohesive strength and adhesive properties. After irradiation it was highly tacky, possessed wet grab, and was definitely a eucohesive, rubber-resin type, normally tacky and pressure-sensitive adhesive tape.

This example is illustrative of one embodiment of this broad invention specifically teaching a new rubber-resin type pressure-sensitive adhesive tape and a new method whereby such adhesive tapes may be formed. The method includes irradiating a coating comprising a blend of an elastomeric material which cross-links and one which degrades as a result of irradiation.

Because the pressure-sensitive adhesive tape of this example is not especially tacky nor adhesive in nature until the final step in its manufacture, difficulties which arise in handling tacky adhesive materials and processing such materials through various elements of machinery are avoided. This is a pronounced advance in the art of making such tapes.

*Example VIII*

Low-molecular-weight polyvinyl-n-butyl ether having an inherent viscosity of 0.59 in heptane was coated on a glycol terephthalate film backing ("Mylar"). Coating was accomplished using a concentration of 87% polymer solids by weight in heptane. The heptane was then evaporated and the resulting construction subjected to an average dosage level of 18 megareps. of high-energy electron irradiation. Prior to irradiation the dry coated layer was of a flypaper consistency. It had a very low, or no appreciable, internal strength. After irradiation, the construction was a true pressure-sensitive adhesive tape with high internal strength and adhesive properties.

This example illustrates specifically the high-energy electron irradiation of a very low molecular weight polymer, not usable as a pressure-sensitive adhesive nor possessing the required properties thereof, to convert it into a pressure-sensitive adhesive usable as, and possessing the required properties of, such adhesives. Irradiation, at dose levels preferably between approximately 10 and 20 magareps., of coatings of this and other low molecular weight polymers, such as a copolymer of 95% fusel oil acrylate and 5% acrylic acid, converts them into highly satisfactory pressure-sensitive adhesives. Thus a new, extremely simple and convenient method is disclosed for making pressure-sensitive adhesive tapes, which method involves irradiating a low molecular weight and non-cohesive polymer in the form of a coating on a backing, to strengthen the same into a pressure-sensitive adhesive.

*Example IX*

| | Parts by weight |
|---|---|
| Latex crepe natural rubber | 100 |
| Wood rosin | 25 |
| Phenolic thermosetting resin | 20 |
| Titanium dioxide ("Titanox A") pigment | 20 |
| Zinc oxide pigment | 20 |
| Heptane | 600 |

The phenolic resin employed was "Bakelite BR–14634" which is an oil-soluble, heat and oil reactive phenol-aldehyde resin, compatible with the other adhesive components. It is understood to be a para-tertiary-butyl-phenol formaldehyde resin made with an alkaline catalyst and with more than one mol, i.e., between 1.5 and 2.0 mols, of formaldehyde for each mol of substituted phenol.

The rubber and pigments were milled together, the mass transferred to a heavy-duty internal mixer, the resins added and the mass worked for approximately one hour at about 300° F. until a uniform blend was obtained. Then the solvent was added and mixing continued until a uniform blend was obtained. During this treatment, some of the thermosetting resin reacted to strengthen the rubbery polymer of the adhesive. The adhesive mass was then coated, at a coating weight of 10 grains dry weight per 24 square inches, on an impregnated flatstock paper backing and the solvent evaporated.

The tape so formed failed within 75 minutes in the hot shear test. A sample irradiated with high-energy electrons to a dose level of 1 megarep. was strengthened so as to withstand 120 minutes in this test. At the 3 megareps. level, the tape withstood 180 minutes.

This pronounced improvement in internal strength was accompanied by other results even more surprising. Instead of destroying the thermosetting quality of the tape, which is of importance in certain electrical uses, irradition left this property unchanged. The adhesive qualities, tack, and wet grab of all samples also remained unchanged. A quantity of a thermosetting agent, i.e., on the order of 5 to 20 parts per hundred of rubbery polymer, is suitable to employ in the adhesive layer of these tapes to gain the advantages of thermosettability.

It is accordingly possible by the practice of this invention to prepare electrical tapes of excellent cohesive strength, adhesiveness, wet grab, tack, and other properties, and in addition, possessing thermosetting qualities so as to be capable of solidifying to an insoluble, infusible stage by heat treatments. Heating each of the three tapes of this example for approximately 2 hours at 250° F. produced in each case an infusible, insoluble mass. The advantage of high cohesive strength in electrical tapes, such as here attained by irradiation, without loss of other properties lies in the ease with which pressure-sensitive tapes of this type may now be applied in use, particularly as used in manufacturing processes, and in the improved exceptional strength the tapes have in insulating position prior to heat hardening if the latter step is required. This is of particular note in the manufacture of electrical coils where the strength of tapes made according to this invention permits formerly required preliminary heat-setting steps to be eliminated.

Furthermore, in electrical uses where heat-setting is impossible, the improved tapes of this invention can be used advantageously without such a step. An example of such a use is inside intricate relay constructions where heat would adversely affect delicate metallic structures and where the highly adhesive and cohesive properties of the tapes hereof can be used to gain sturdy and long-aging insulation qualities as well as protection from solvents, oils, etc. without heat treatment.

This invention also permits tough electrical tapes to be formed without the presence of certain materials such as sulfur, chlorine, benzoyl peroxide and the like. These materials have been used in the past in certain specialized rubber-resin type pressure-sensitive adhesives. Sulfur is particularly bad as an ingredient since it attacks copper under conditions in which such tapes are used. Benzoyl peroxide, which has been used to obtain tapes having resistance to aliphatic solvents, promotes a thermosetting reaction in the adhesive layer which is extremely difficult to control and causes the tape to seal upon itself. Now, however, electrical tapes may be made without these harmful ingredients but possessing all the advantageous properties imparted to tapes by their presence, properties such as solvent resistance, internal strength, adhesive strength, excellent heat resistance, i.e., high melting points, and others. Furthermore, thermosetting materials may now even be omitted in many electrical tape formulations.

Effective electron irradiation of pressure-sensitive adhesive tapes may be accomplished using any suitable apparatus, e.g., a Van de Graff generator, a capacitron, resonant transformer, or the like. Sources which emit high-energy electrons either intermittently, e.g., pulse irradiation, or continuously may be employed.

The methods employed to accomplish irradiation according to the practice of this invention are best illustrated by reference to the figures in the drawing, in which:

Figure 1 illustrates "jumbo" irradiation and is a schematic representation in side elevation of a roll of rubber-resin type pressure-sensitive adhesive tape undergoing irradiation.

Figure 2 illustrates "multiple-pass" irradiation and is a schematic representation in side elevation of a web of tape undergoing irradiation.

Figure 3 illustrates a modification of the jumbo irradiation method and is a perspective view of a roll of tape undergoing irradiation.

Referring now to Figure 1, the rubber-resin type pressure-sensitive adhesive tape roll 10 is unwound as at 11 beneath a source of irradiation 12 and in a direction as indicated by the arrow. The axis of the roll of tape is in a plane perpendicular to the direction of irradiation. The point of unwind, where the tape receives bombardment, is approximately 10 cm. from the window of the high-energy electron irradiation source.

This method is especially advantageous from the standpoint of most efficient utilization of the energy omitted. Electrons penetrating the outermost layer of tape are absorbed by the underlying layers; thus very effective electron absorption is obtained by using this method. The very nature of the method reduces greatly any exposure of the tape being irradiated to possible substances in the immediate atmosphere which might affect the tape deleteriously. The method also causes each layer of tape to receive a plurality of doses of irradiation until the tape is removed from the roll. In the alternative, the tape may be irradiated at the point of winding it into roll. Also irradiation according to this method may be practiced with the adhesive layer either outermost or innermost of the roll.

As a specific illustration of the above method using a cathode ray tube powered by a resonant transformer as the irradiation source and employing source conditions of 1 million volts and 500 micro amperes giving 500 watts, and using a 2½ inch diameter window, the rate of unwind of a tape 3 mils thick and having a tape density of approximately 1.25, such as in Example V, for an average dose level of 3 megareps. across a 2½ inch web, is approximately 59 feet per minute. Various conditions, however, may be employed to gain identical average dosage levels of high-energy electron irradiation in adhesive layers.

Referring now to Figure 2, a strip of tape 26 is unwound from roll 20 and passed back and forth around a plurality of relatively small diameter rollers 21, 22, 23, 24, and 25 beneath a source of high-energy electron irradiation, being then rewound in roll 27. The rollers serve to hold the web of tape taut as the various substantially parallel layers of it move beneath the window 28 of the source of irradition. Rollers in contact with the adhesive coating on the web of tape may be provided with a low adhesion surface. The layer of tape nearest the source is approximately 10 cm. away from the source window 28.

This method of treatment causes the layers of the webs nearest the source to receive the most intense treatment and absorb the greatest amount of irradiation. Distances between the various layers and the rate of movement of the tape are varied to obtain desired dosage levels of irradiation in any particular tape. Much irradiation, however, is lost to the air in practicing this method. The temperature of the tape during irradiation using this method remains desirably low, i.e., no appreciable increase in temperature is detectable.

Figure 3 illustrates a method of irradiating tapes which is considered quite effective for certain purposes, especially where the tape is required to have a gradation of properties in a direction lateral to its length. One such use is that of providing a solvent resistant seal as well as a filler seal along the seam of two meeting plates. The roll of tape 30 is merely placed on its side approximately 10 cm. from an irradiation source 31. Each side of the roll may be irradiated in this manner. If both sides are irradiated, the resulting tape has increased cohesive strength along each edge but may remain unchanged in cohesive strength down the center thereof, depending upon the width of the tape and upon the penetration of high-energy electrons.

The rubber-resin type pressure-sensitive adhesives within the broad scope of this invention are those which contain an elastomer which is polymerized, i.e., cross-linked or otherwise increased in molecular weight, by high-energy electron irradiation. In all cases this irradiation renders such rubbery polymeric elastomer of our tapes highly resistant to solvents. In fact, the preferred tapes hereof are irradiated to such an extent that their cross-linked elastomers are no longer dispersible in the solvents used in coating the adhesive layer on the carrier web, or in other common solvents. In effect, they are solvent resistant. Examples I, II, III, VI, VII, and IX, are particularly noteworthy in this respect. By no other method is it possible to do this and still retain undiminished other desirable properties of the tapes, particularly adhesive characteristics. In the usual case, approximately a 3 megarep. dose level of irradiation will accomplish this result. In all cases, the cohesive strength of tapes treated according to this invention is at least approximately doubled, as measured by the hot shear test aforementioned.

Components which degrade on being irradiated with high-energy electrons may be included in the adhesive layer. For example, both polyisobutylene and polymethylmethacrylate degrade during irradiation, but may be included, in suitable formulations, frequently with particularly advantageous results as indicated in Example VII. It should be noted that these rubbery polymeric elastomers also show a decrease in 10 minute constant stress modulus as a result of irradiation, as will be evident from the disclosure to follow.

The elastomers which may be cross-linked by high-energy electron irradiation, and therefore, which constitute a required component of our rubber-resin type adhesive layers, are those which also exhibit an increase in ten-minute constant stress modulus, as measured by the test disclosed in an article entitled "Elasticity of Soft Polymers" by C. A. Dahlquist, J. O. Hendricks, and N. W. Taylor in Industrial and Engineering Chemistry, vol. 43, p. 1404, June 1951.

To illustrate the method therein disclosed, a carefully measured section of a rubbery polymeric elastomer having a cross-sectional area in the range of 0.10 to 0.02 square centimeters was cut out and suitably fastened between supports initialy separated a distance of 3.0 centimeters. At a stress applied of 1,000 grams per square centimeter, being within the desired range of 500 to 2500 grams/sq. cm., measurement of the length of the stretched film was taken at 10 minutes. The elongation was found to be 6.0 cm. The value of the ten-minute constant stress modulus thus becomes $$E_{cs} = \frac{1000 \times 3 \times g}{6 \times 10^6}$$

$$= 0.49 \text{ megadynes/sq. cm.}$$

where $g$, the acceleration due to gravity, is 981 cm./sec.$^2$.

If, after treatment with high-energy electron irradiation, such an adhesive forming elastomer gives an increase in constant stress modulus, it is suitable to employ as the rubbery polymeric elastomer component of a rubber-resin type adhesive layer treated according to this invention. Examples of such materials are the diene-type polymers such as natural rubber, butadienes, neoprene, butadiene-styrene copolymers, elastomeric ethers such as polyvinylalkyl ethers; elastomeric acrylates such as poly-n-butyl acrylate, methyl isoamylacrylate-fusel oil acrylate; and elastomeric siloxanes such as poly dimethyl siloxanes.

That I obtain increased internal strength without decreased adhesive properties in rubber-resin type layers consisting essentially of single rubbery polymeric elastomers, such as certain acrylates or siloxane elastomers, is most unusual. These elastomers also increase in constant stress modulus, as above defined, when irradiated. Because of their unique properties, they may be classed as adhesomers, i.e., elastomers which have the correct physical properties so as to be pressure-sensitive adhesives in themselves.

As the resin component in those rubber-resin type pressure-sensitive adhesives within the scope of this invention containing resins, any compatible tackifier resin may be employed as may be noted from the above examples. Such resins must be compatible for the reason that they must remain uniformly blended in the dried adhesive, i.e., they may not separate into a distinct phase in the dried adhesive. It appears that high-energy electron irradiation does not alter this component of rubber-resin type layers, or at least does not adversely affect the properties it desirably exhibits.

Inert fillers such as dixie clay, zinc oxide, etc., may be blended in the adhesive layer of the tapes hereof. Likewise, antioxidants and other agents may be blended in the adhesive layer.

The thickness of adhesive layers and the coating weights of adhesive employed in fabricating pressure-sensitive adhesive tapes according to this invention may vary considerably; however, for adequate adhesive characteristics in the tape, a coating weight of at least 2 grains of adhesive solids, i.e., dried adhesive, per 24 square inches of tape backing is necessary. It is preferred to use at least approximately 5 grains of adhesive solids per 24 sq. in. of tape backing. Up to approximately 50 grains of adhesive solids per 24 square inches of tape backing may be employed advantageously in certain tapes such as electrical tapes designed for durable insulation. Usually, however, sufficient body is attained by using coating weights between approximately 5 and 45 grains per 24 square inches of backing. Adhesive layer thickness is preferred to be between approximately 0.5 mils to 5.0 mils. By the practice of this invention, pressure-sensitive adhesive tapes having strong, tough, thick and non-splitting adhesive layers can be made.

The flexible backings for my tapes, may be fibrous or non-fibrous, impregnated or non-impregnated transparent or opaque, thin metal or non-metal strips, or combinations of the foregoing, and the like. Examples are various papers, cloths, cellophane (regenerated cellulose), glycol terephthalate ("Mylar"), cellulose acetate, aluminum foil, etc.

Although high-energy electrons were experimentally employed in the making of improved pressure-sensitive adhesive tapes according to this invention, the use of other high-energy irradiation to perform substantially the same function in substantially the same way to give substantially the same result is to be contemplated as an equivalent of the teachings hereof. For example, irradiation using radioactive isotopes such as those of cobalt is to be contemplated as an equivalent.

Likewise, I have specifically described my invention in terms of irradiating adhesive layers after they have been adherently attached to flexible backings. Substantially the same result as that set forth herein can be gained by irradiating an extruded film or sheet of pressure-sensitive-adhesive-forming substance prior to laminating the same onto a flexible backing. I may also apply a layer of pressure-sensitive-adhesive-forming substance on a temporary carrier, subject the composite structure to high-energy electron irradiation, and transfer the pressure-sensitive layer to a permanent flexible adhesive tape backing.

High-energy electron irradiation may be used as set forth herein to provide pressure-sensitive adhesive tapes having exceptional resistance to shearing forces and which are, therefore, particularly useful in sealing or bonding constructions where constant static stresses act upon them. For example, steel plates under constant spring tension can now be sealed together without the bond breaking under ordinary conditions. Heavier tapes made according to this invention may be used in binding steel plates, and the like, together as an article suitable for shipment.

Pressure-sensitive adhesive masking tapes made according to this invention will remain in bonding position under the high temperatures generally employed in certain masking tape operations in the automotive industry, and in addition, may, when desired, be removed in their entirety at such temperatures. A common source of difficulty with prior art tapes has been that a residue is left when the tapes are removed from surfaces at such high temperatures.

Having described my invention in specific but not limitative examples, what is claimed is as follows:

1. In a process of making rubber-resin type pressure-sensitive adhesive sheeting, the steps of forming a pressure-sensitive adhesive layer adapted to provide the rubber-resin type pressure-sensitive adhesive material of the product, said adhesive layer comprising a polymer cross-linkable by high-energy electron irradiation, and irradiating said layer with high-energy electrons to provide a total irradiation dose level of absorption of between approximately 1 and 20 megareps., said adhesive layer being at least approximately doubled in cohesive strength as measured by the hot shear test herein defined without suffering a loss of pressure-sensitive adhesive properties as a result of said irradiation.

2. In a process of making a roll of rubber-resin type pressure-sensitive adhesive sheeting, the steps of forming a pressure-sensitive adhesive layer adapted to provide the rubber-resin type pressure-sensitive adhesive material of the product, said adhesive layer comprised essentially of a low molecular weight polymer cross-linkable by high-energy electron irradiation, and irradiating said layer with high energy electrons to provide a total irradiation dose level of absorption of between approximately 1 and 20 megareps., said adhesive layer being at least approximately doubled in cohesive strength as measured by the hot shear test herein defined without suffering a loss of pressure-sensitive adhesive properties as a result of said irradiation.

3. In a process of making a roll of rubber-resin type pressure-sensitive adhesive sheeting, the steps of forming an adhesive layer adapted to provide the rubber-resin type pressure-sensitive adhesive material of the product, said adhesive layer comprising a rubbery polymeric elastomer cross-linkable by high-energy electron irradiation and at least one other rubbery polymeric elastomer, said last-mentioned other rubbery polymeric elastomer being susceptible to degradation by said irradiation, and irradiating said layer with high-energy electrons to provide a total irradiation dose level of absorption of between approximately 1 and 10 megareps., said layer being changed by said irradiation into a highly cohesive, normally tacky and pressure-sensitive adhesive mass at room temperature.

4. The method of increasing the cohesive strength of, while maintaining full adhesion value in, a pressure-sensitive adhesive of the rubber-resin type and comprising at least one rubbery polymeric elastomer which is susceptible to cross-linking by high-energy electron irradiation, said method comprising forming a layer of said adhesive and irradiating said layer with high-energy electrons to give a dose level of absorption between approximately 1 and 10 megareps. and sufficient to at least approximately double the cohesive strength of said adhesive as measured by the hot shear test herein defined, said resulting irradiated adhesive layer being characterized by pressure-sensitive adhesive properties, measured by the "strip back" adhesive test herein defined, at least as great as those exhibited by said layer prior to irradiation.

5. The method of increasing the cohesive strength of, while maintaining full adhesion value in, a pressure-sensitive adhesive of the rubber-resin type and consisting essentially of one rubbery polymeric adhesomer which is susceptible to cross-linking by high-energy electron irradiation, said method comprising forming said adhesive into a layer and irradiating said layer with high-energy electrons to give a dose level of absorption of between approximately 1 and 10 megareps. and sufficient to at least approximately double the cohesive strength of said adhesive as measured by the hot shear test herein defined, said resulting irradiated adhesive layer being characterized by pressure-sensitive adhesive properties, measured by the "strip back" adhesive test herein defined, at least as great as those exhibited by said layer prior to irradiation.

6. The method of increasing the cohesive strength of, while maintaining full adhesion value in, a pressure-sensitive thermosettable adhesive of the rubber-resin type and comprising a thermosetting resin and at least one rubbery polymeric elastomer which is susceptible to cross-linking by high-energy electron irradiation, said method comprising forming a layer of said adhesive and irradiating said layer with high-energy electrons to give a dose level of absorption of between approximately 1 and 10 megareps. and sufficient to at least approximately double the cohesive strength of said adhesive as measured by the hot shear test herein defined, said resulting irradiated adhesive layer being characterized by pressure-sensitive adhesive properties, measured by the "strip back" adhesive test herein defined at least as great as those exhibited by said layer prior to irradiation, and being further characterized by being solidifiable at elevated temperatures into an infusible, insoluble mass.

7. The method of increasing the cohesive strength of, while maintaining full adhesion value in, a pressure-sensitive adhesive of the rubber-resin type and comprising at least one rubbery polymeric elastomer which is susceptible to cross-linking by high-energy electron irradiation, said method comprising forming a layer of said adhesive and irradiating said layer with high-energy electrons to give a dose level of absorption within the range of approximately 3–10 megareps. and sufficient to at least approximately double the cohesive strength of said adhesive as measured by the hot shear test herein defined, as well as to substantially insolubilize the cross-linked elastomeric component of said adhesive, said resulting irradiated adhesive layer being characterized by pressure-sensitive adhesive properties, measured by the "strip back" adhesive test herein defined, at least as great as those exhibited by said layer prior to irradiation.

8. The method of producing a pressure-sensitive adhesive tape of high internal strength comprising applying on a flexible backing a pressure-sensitive adhesive layer containing at least one rubbery polymeric elastomer which is susceptible to cross-linking by high-energy electron irradiation, and irradiating the resulting article with high-energy electrons to give a total irradiation dose level of absorption between approximately 1 and 10 megareps., said adhesive layer being, as a result of said irradiation, at least approximately doubled in cohesive strength as measured by the hot shear test herein defined without suffering a loss of pressure-sensitive adhesive properties measured by the "strip back" adhesive test herein defined.

9. The method of producing a pressure-sensitive adhesive of high internal strength comprising applying on a flexible backing an adhesive layer containing at least one rubbery polymeric elastomer which is susceptible to cross-linking by high-energy electron irradiation, winding said resulting tape article into a roll, and irradiating the resulting roll with a substantially uniform concentration of high-energy electrons applied perpendicularly to the axis of said roll to give a substantially uniform dose level of absorption in the outer layer of tape in said roll of between approximately 1 and 10 megareps. while simultaneously unwinding said tape from said roll, said resulting irradiated adhesive layer being characterized by an increase in cohesive strength as a result of said irradiation and by pressure-sensitive adhesive properties, measured by the "strip back" adhesive test herein defined, at least as great as those exhibited by said layer prior to irradiation.

10. In a process of making a rubber-resin type pressure-sensitive adhesive sheeting, the steps of (1) forming upon a flexible backing member a pressure-sensitive adhesive layer between about 0.5 and 5 mils thick, said adhesive layer being adapted to provide the pressure-sensitive adhesive material of the product and comprising a polymer cross-linkable by high energy electron irradiation and exhibiting an increase in 10-minute constant stress modulus, as herein defined, when irradiated, and (2) irradiating said layer with high energy electrons to provide a total irradiation dose level of absorption of between approximately 1 and 20 megareps., said adhesive layer being at least approximately doubled in cohesive strength as measured by the hot shear test herein defined without suffering a loss of pressure-sensitive adhesive properties measured by the "strip back" adhesive test herein defined.

11. A pressure-sensitive adhesive tape having high cohesive strength comprising a flexible backing member and a layer of a rubber-resin type, electron-irradiated pressure-sensitive adhesive containing an electron-irradiated rubbery polymeric elastomer, said pressure-sensitive tape being characterized by a cohesive strength, as measured by the hot shear test herein defined, which is at least approximately twice as great as that cohesive strength exhibited by the non-irradiated tape, and by pressure-sensitive adhesive properties, measured by the "strip back" adhesive test herein defined, at least as great as those exhibited by said tape prior to irradiation.

12. A pressure-sensitive adhesive tape comprising a flexible backing member and a layer of a water-insoluble, rubber-resin type, pressure-sensitive adhesive consisting essentially of an electron-irradiated mixture of rubbery polymeric elastomers, one of which is an electron-irradiated cross-linked elastomer, and a second different one of which is an electron-irradiated degraded elastomer, the said pressure-sensitive adhesive being characterized by being highly cohesive and by being normally tacky and pressure-sensitive at room temperature.

References Cited in the file of this patent

UNITED STATES PATENTS

| | | |
|---|---|---|
| Re. 23,843 | Oace et al. | June 29, 1954 |
| 1,906,402 | Newton | May 2, 1933 |
| 2,410,079 | Kellgren | Oct. 29, 1946 |
| 2,668,133 | Brophy et al. | Feb. 2, 1954 |
| 2,763,609 | Lewis et al. | Sept. 18, 1956 |
| 2,766,220 | Kantor | Oct. 9, 1956 |

OTHER REFERENCES

Nature, "Irradiation of Linear High Polymers," vol. 170, Dec. 20, 1952 (page 1076 relied on).

Nature, "Irradiation of Polymers by High Energy Electrons," vol. 172, July 11, 1953 (page 76 relied on).

Nucleonics, "How Radiation Affects Long Chain Polymers," June 1954 (page 24 relied on).